(12) United States Patent
Gray

(10) Patent No.: US 7,322,090 B2
(45) Date of Patent: Jan. 29, 2008

(54) EXPLOSIVE TUBE REMOVAL DEVICE

(75) Inventor: Luke G. M. Gray, Waterloo (CA)

(73) Assignee: Babcock & Wilcox Canada Ltd., Cambridge, Ontario (CA)

( * ) Notice: Subject to any disclaimer, the term of this patent is extended or adjusted under 35 U.S.C. 154(b) by 87 days.

(21) Appl. No.: 11/038,842

(22) Filed: Jan. 19, 2005

(65) Prior Publication Data

US 2006/0156527 A1 Jul. 20, 2006

(51) Int. Cl.
 B23P 19/02 (2006.01)
 B25C 1/08 (2006.01)

(52) U.S. Cl. .................. 29/426.4; 29/700; 29/726; 29/727; 29/33 T; 29/426.5; 29/890.031; 29/255; 29/282; 89/1.14; 227/9; 227/10

(58) Field of Classification Search .......... 29/426.4, 29/426.5, 426.1, 402.03, 421.2, 33 T, 727, 29/726, 700, 890.031, 254, 255, 282; 138/97; 89/1.14; 227/9, 10

See application file for complete search history.

(56) References Cited

U.S. PATENT DOCUMENTS

| | | | | |
|---|---|---|---|---|
| 1,964,023 A | * | 6/1934 | Armstrong | 29/252 |
| 2,653,504 A | * | 9/1953 | Smith | 411/391 |
| 3,119,302 A | * | 1/1964 | Barr | 89/1.14 |
| 3,120,700 A | * | 2/1964 | Chuplis, Jr | 29/726 |
| 3,196,745 A | * | 7/1965 | Sustrich et al. | 89/1.14 |
| 3,228,757 A | | 1/1966 | Verbraak | |
| 3,377,010 A | | 4/1968 | Suzuki et al. | |
| 3,791,011 A | * | 2/1974 | Keys | 29/252 |
| 4,036,137 A | * | 7/1977 | Dietrich | 89/1.14 |
| 4,054,032 A | * | 10/1977 | Patrichi | 60/632 |
| 4,077,102 A | * | 3/1978 | Smith | 29/252 |
| 4,095,335 A | * | 6/1978 | Lassarat | 29/726 |
| 4,103,618 A | * | 8/1978 | Dietrich | 89/1.14 |
| 4,180,903 A | | 1/1980 | Hannigan, Jr. | |
| 4,283,826 A | * | 8/1981 | Miller | 29/252 |
| 4,355,450 A | * | 10/1982 | Miller | 29/426.5 |
| 4,571,802 A | * | 2/1986 | Calhoun et al. | 29/890.031 |
| 4,641,774 A | | 2/1987 | Krawchuk et al. | |
| 4,879,890 A | | 11/1989 | Hardwick | |
| 5,022,148 A | | 6/1991 | Feldstein et al. | |
| 5,038,994 A | | 8/1991 | Feldstein et al. | |
| 5,119,555 A | * | 6/1992 | Johnson | 29/254 |
| 5,245,738 A | * | 9/1993 | Johnson | 29/413 |
| 5,331,894 A | * | 7/1994 | Wassell et al. | 102/275.12 |

(Continued)

FOREIGN PATENT DOCUMENTS

EP 102188 A2 * 3/1984

(Continued)

*Primary Examiner*—Essama Omgba
(74) *Attorney, Agent, or Firm*—Michael J. Seymour; Eric Marich

(57) ABSTRACT

A explosive device is disclosed for collapsing an expansion-fit metal tube from within a hole of a metal plate of a boiler or the like. The device includes a connecting rod inserted into the tube and extending outwardly from top and bottom ends of the tube. The portion of the connecting rod extending out of the top end of the tube is encapsulated by a blast chamber containing an explosive charge. The portion of the connecting rod extending out of the bottom end of the tube is secured via a retaining plate held by a washer and nut threaded to the connecting rod.

11 Claims, 1 Drawing Sheet

U.S. PATENT DOCUMENTS

| | | | | |
|---|---|---|---|---|
| 5,337,470 | A * | 8/1994 | Hoffman et al. | 29/426.5 |
| 5,826,334 | A * | 10/1998 | Weeks et al. | 29/890.031 |
| 5,893,209 | A * | 4/1999 | Weeks et al. | 29/727 |
| 5,974,642 | A * | 11/1999 | Weeks et al. | 29/33 T |
| 5,983,487 | A * | 11/1999 | Snow et al. | 29/727 |
| 6,205,632 | B1 | 3/2001 | Weeks et al. | |
| 6,631,667 | B1 * | 10/2003 | Chisholm | 89/1.14 |
| 6,732,425 | B2 * | 5/2004 | Schafer | 29/727 |
| 7,093,360 | B1 * | 8/2006 | Craig | 29/890.031 |
| 7,146,716 | B2 * | 12/2006 | Gray | 29/726.5 |
| 7,168,143 | B2 * | 1/2007 | Gray | 29/252 |
| 7,194,800 | B2 * | 3/2007 | Gray | 29/727 |
| 7,297,908 | B2 * | 11/2007 | Yoshida et al. | 219/635 |

FOREIGN PATENT DOCUMENTS

GB            2045122 A    * 10/1980

* cited by examiner

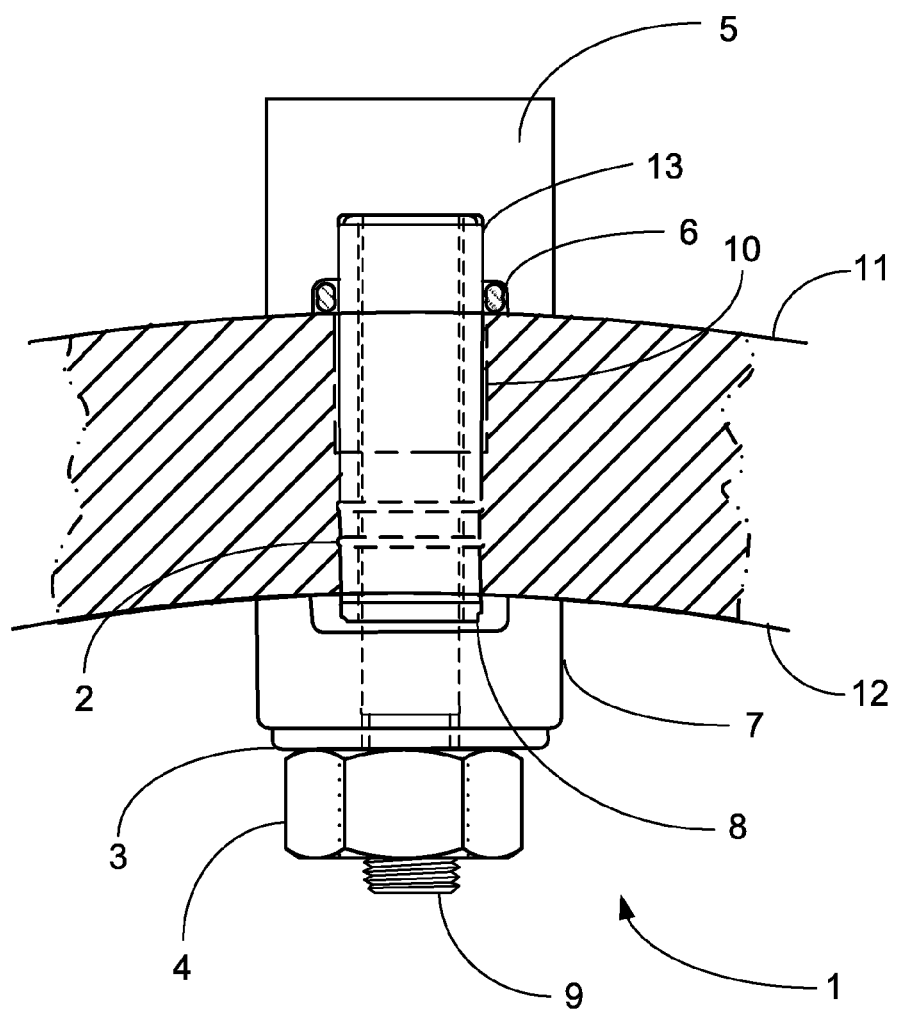

EXPLOSIVE TUBE REMOVAL DEVICE

FIELD AND BACKGROUND OF INVENTION

The present invention relates generally to the field of metal working and in particular to an improved tube extracting device for facilitating the removal of tubes from different types of structures, such as boilers, condensers, evaporators, heat exchangers, and the like.

A typical heat exchanger comprises a pair of parallel tube sheets, a plurality of baffle plates, and a plurality of heat exchanger tubes. The tube sheets are located at the ends of the heat exchanger. The baffle plates are positioned between the tube sheets and generally parallel thereto. The tubes extend between the tube sheets and through the baffle plates and are supported by the tube sheets. The tube sheets and baffle plates have a series of aligned holes formed therein, and the tubes are inserted through these holes and then expanded in the areas of the tube sheets into fluid-tight pressure contact therewith.

Because of malfunctions or normal preventive maintenance, it may be necessary to remove one or all of the tubes from the structure. To replace the tubes they are generally cut between the tube ends and the expanded ends of the tubes forcibly withdrawn from the tube sheets an inch or two until they can be withdrawn by hand. Tubes are also conventionally removed by the use of an air hammer or the like, chipping away at the tube connection to the drum, to physically force the tube from the associated opening in the boiler drum. These methods have often resulted in damage to the drum and the opening through which the tube stub section projected.

Various tools have been suggested for removing these tubes by using wedges that are driven inside a bore of a structure, expanded for engaging the inside wall of a tube and retracted for pulling the tube out of the bore. For example, U.S. Pat. No. 4,355,450 to Miller discloses a tube extracting mechanism having a wedge with expandable circumferential gripping teeth.

Another method often used for removing tubing from structures is by use of a cutting torch. This is particularly common in the case of large boilers using heavy walled tubing on the order of three inches in diameter. Errors in use of the cutting torch can, of course, damage the tube sheet requiring expensive refinishing and repair work.

The primary problem with all these prior art structures is that they impose an expansion force on the tube precisely at the point where it is engaged with the tube sheet which can damage the metal between adjacent holes and cause the holes in the tube sheet to enlarge and not properly grip a new tube when it is expanded. Moreover, the prior art devices require additional moving parts which increase the likelihood of malfunctions and breakage of the device, which results in an increase of down-time of the structure for repairs.

Other tools for removing tubes include collapsing gripping devices for engaging the tube and pulling the tube out of the tube hole as exemplified in U.S. Pat. No. 6,205,632 to Weeks et al. and U.S. Pat. No. 4,180,903 to Hannigan, Jr. These prior art devices have complex and bulky structures comprised of a plurality of moving parts subject to easy breakage and expensive repair.

A simple device is needed without the complex and bulky structures of the prior art, requiring little or no repair.

Explosive force is known in the art for deforming metal. U.S. Pat. No. 3,228,757 to Verbraak which discloses a method for explosively deforming material, sheet, or metallic object having a mainly cubically face centered crystal lattice. Detonation of an explosive produces a shockwave directed at least substantially parallel to the direction of the crystal lattice.

Explosive force has been used to expand tubes or sleeves within a hole as taught by U.S. Pat. No. 4,879,890 to Hardwick and U.S. Pat. No. 5,983,487 to Snow et al. Explosives are also well known for welding tubes or sleeves, as exemplified in U.S. Pat. No. 5,022,148 to Feldstein et al., U.S. Pat. No. 5,038,994 to Feldstein et al., U.S. Pat. No. 4,641,774 to Krawchuk et al., and U.S. Pat. No. 3,377,010 to Suzuki et al.

As of yet, an explosive device has not been taught or suggested for removing tubes which have been expanded into fluid-tight pressure contact within a hole in a boiler, heat exchanger or the like.

SUMMARY OF INVENTION

It is an object of the present invention to provide an explosive means for collapsing a tube that has been expanded within a hole in a drum or plate of a boiler or the like.

It is another object of the present invention to provide a quick means for removing a tube which has been expanded within a hole in a drum or plate of a boiler or the like.

It is a further object of the present invention to eliminate the need for complex mechanical cutting, gripping, and extracting devices which can easily be broken, thereby increasing down-time and repair time.

Accordingly, an explosive device is provided for collapsing a metal tube that has been expanded within a hole of a metal plate of a boiler or furnace. The device includes a connecting rod that is inserted into the tube and extends out of both ends of the tube. The portion of the connecting rod extending out of the top end of the tube is encapsulated by a blast chamber. The blast chamber also contains an explosive charge on opposite sides of the encapsulated tube. A labyrinth seal is provided between the blast chamber and the top end of the tube and connecting rod. The portion of the connecting rod extending out of the bottom end of the tube is secured via a retaining plate, washer, and nut respectively.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

In the drawings:

FIG. 1 is a schematic diagram of the explosive device of the present invention.

DESCRIPTION OF THE PREFERRED EMBODIMENTS

Referring now to the drawing, in which like reference numerals are used to refer to the same or similar elements, FIG. 1 shows an explosive tube removal device placed over a tube 8 for removing the tube 8 from a hole 10 within about a 4" metal drum or plate having an outer surface diameter 11 and an inner surface diameter 12. The tube 8 has been expanded into fluid-tight pressure contact within the hole 10.

Furthermore, tube 8 has been expanded into ring grooves 2 in the walls of the drum surrounding the hole 10.

The explosive removal device 1 has a top end that is above the hole 10 and outer surface diameter 11 and a bottom end that is below the hole 10 and inner surface diameter 12.

The explosive removal device 1 further comprises a cylindrical connecting rod 9 which is inserted within the tube 8 which is expanded within hole 10. The connecting rod 9 is longer than the hole 10 and tube 8 and extends beyond the top and bottom ends of both hole 10 and tube 8.

At the top end of the device 1, the tube 8 and the connecting rod 9 are encapsulated within a blast chamber 5. The tube 8 and connecting rod 9 extend to the same length within the blast chamber 5. The top of the tube 8 is precut to a length which allows it to be the same length as the connecting rod 9 and completely encapsulated by the blast chamber 5.

A labyrinth style sealing 13, which is a non-contacting circumferential seal, is provided between the blast chamber 5 and the tube 8. The labyrinth seal gives the tube 8 a close tolerance fit within the blast chamber 5. An explosive charge 6 is also located inside the blast chamber 5 on opposite sides of tube 8 at the interface between the tube 8, the blast chamber 5, and the outside surface diameter 11 of the drum or plate. The explosive charge 6 inside the blast chamber may be detonated remotely. in one embodiment, dynamite may be used the explosive charge.

At the bottom end of the device 1, the connecting rod 9 is secured in place via a retaining means. The connecting rod 9 extends through a retaining plate 7, a washer 3, and a nut 4 respectively. The retaining plate 7 also encapsulates the bottom end of the tube 8 which slightly protrudes from the bottom end of the hole 10. The nut 4 is threaded onto the bottom end of the connecting rod 9 for securing it.

In alternative embodiments of the invention, the elements of the explosive tube removal device may have a variety of shapes and sizes consistent with the spirit of the invention. For example, the tube 8 may be precut to different lengths above the outer surface diameter 11 of the drum. The size and shape of the blast chamber 5 and retaining plate 7 may also vary although it is expected that the inside shape of the blast chamber 5 and retaining plate 7 will conform to the outside shape of the tube 8 and/or connecting rod 9.

Although the retaining plate 7, washer 3, and nut 4 are preferred means for securing the connecting rod 9, it is understood that the connecting rod 9 may be secured via other conventional retaining means.

While a specific embodiment of the invention has been shown and described in detail to illustrate the application of the principles of the invention, it will be understood that the invention may be embodied otherwise without departing from such principles.

I claim:

1. An explosive tube removal device, comprising:
    a boiler tube sheet with a tube hole,
    a heat exchanger tube expansively fit into the tube hole,
    a connecting rod inserted through said tube within said hole having top and bottom ends which extend outwardly from corresponding top and bottom ends of said tube, respectively, wherein the lower end of the connecting rod is threaded;
    a blast chamber that encapsulates the top end of said tube and the top end of said connecting rod;
    a retaining means at the bottom end of said tube for securing said connecting rod in place; and
    an explosive charge inside said blast chamber.

2. An explosive device according to claim 1, wherein said retaining means comprises a retaining plate and a washer mounted over the connecting rod bottom end secured by a nut threaded onto the bottom end of the connecting rod.

3. An explosive device according to claim 2, wherein a labyrinth seal is provided between the top end of said tube and the chamber which encapsulates the top end of said tube.

4. An explosive device according to claim 1, wherein the explosive charge is dynamite.

5. An explosive device according to claim 1, wherein a labyrinth seal is provided between the top end of said tube and the blast chamber which encapsulates the top end of said tube.

6. An explosive device according to claim 1, further comprising two explosive holding chambers located within the blast chamber on opposite sides of the labyrinth seal at the interface of the tube and tube sheet.

7. An explosive device according to claim 6, wherein the tube comprises a plurality of ring grooves.

8. A method of removing a expansion-fit tube from a tube sheet, comprising the steps of:
    providing a tube sheet having a plurality of tube holes,
    providing a heat exchanger tube, wherein the heat exchanger tube has been expansively fit into a tube hole on the tube sheet,
    inserting a connecting rod having top and bottom ends through said tube within said hole so that the connecting rod top end and bottom end extend out of top and bottom ends of said tube respectively;
    capping the top end of said tube and the top end of said connecting rod with a chamber;
    securing the connecting rod at the bottom end thereof;
    providing at least two explosive charges,
    placing the explosive charges on opposite sides of the tube at the interface of the tube, the chamber, and the tube sheet; and
    remotely detonating the explosive charges, wherein the step of detonating creates sufficient backpressure in the chamber to drive the explosion between the tube and the tube hole, thereby imploding the tube and reducing the tube diameter.

9. A method according to claim 8, wherein the connecting rod is secured by mounting a retaining plate and a washer over the bottom end of the connecting rod and threading a nut onto the bottom end of the connecting rod to secure the retaining plate and washer.

10. A method according to claim 9, wherein the tube comprises a plurality of ring grooves and the step of detonating creates sufficient backpressure to implode the ring grooves.

11. A method according to claim 8, wherein the explosive charge is dynamite.

* * * * *